United States Patent Office 3,306,852
Patented Feb. 28, 1967

3,306,852
IMIDES OF ARENE POLYAMINES USED AS
LUBRICATING OIL ADDITIVES
Yngve G. Hendrickson, El Cerrito, Calif., assignor to
Chevron Research Company, a corporation of Delaware
No Drawing. Filed June 18, 1964, Ser. No. 376,222
5 Claims. (Cl. 252—32.7)

This invention concerns novel derivatives of arene polyamines and substituted arene polyamines and their use as detergents in lubricating oil compositions.

Present-day internal combustion engines operate at high speeds and high compression ratios. When used in the so-called city stop-and-go driving—the major type of driving conditions for a larger percentage of today's automobiles—the internal combustion engines do not reach the most efficient operating temperature. Under city driving conditions, large amounts of partial oxidation products are formed and reach the crankcase of the engine by blowing past the piston rings. Most of these partial oxidation products are oil insoluble, tending to form deposits on the various operating parts of the engine, such as the pistons, piston rings, etc. For the purpose of preventing the deposition of these products on the various engine parts, it is necessary to incorporate detergents in the lubricating oil compositions, thus keeping these polymeric products highly dispersed in a condition unfavorable for deposition on metals.

Under the harsh conditions of the engine—oxidative, acidic, trace metal catalysis—detergents undergo decomposition. It is therefore desirable to have detergents which are able to retain their detersive capability—maintaining the polymeric materials in suspension—for long periods of time.

Pursuant to this invention, acyl derivatives of arene polyamines and substituted arene polyamines are prepared which find use as detergents in lubricating oils. That is, non-fused arene polyamines having one to two rings which are carbocyclic or have one nitrogen annular member and having at least two amino groups, generally from 2 to 6 amino groups, at least one of which is primary. Preferably, at least two, and more preferred, all of the amino groups are primary. At least one of the primary amino groups is bonded to form an imide with a dicarboxylic acid capable of forming a cyclic anhydride. (In preparing the imide, the reaction may not go to completion and amides may be formed, as well. When referring to imides, it is intended to include the presence of amides [diamides or amic acids].) The aliphatic dicarboxylic acid has a long hydrocarbon chain providing oil solubility.

The arene amines of this invention are benzene polyamines, semidines, benzidines and pyridine polyamines.

The arene amines used in this invention have, for the most part, the following generic formula

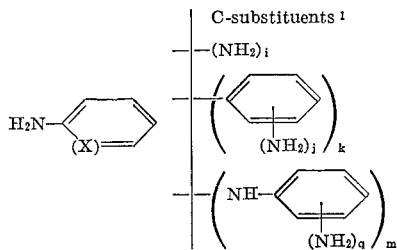

[1] C-substituents indicates the radicals to the right of the vertical line are bonded to a carbon atom of the formula to the left of the line.

wherein X is N or CH, $i$ is a cardinal number of from 0 to 3, preferably an integer of from 1 to 3, $j$ is an integer of from 1 to 3, and $q$ is a cardinal number of from 0 to 3; $j$ and $q$ are preferably equal to $i$, when $k$ or $m$ is greater than 0; $k$ and $m$ are cardinal numbers of from 0 to 1. Generally, $k+m$ will be equal to or less than 1. The sum of $i+k+m$ will be greater than 0.

As indicated, the arene ring is carbocyclic having 6 annular carbon members or heterocyclic having 5 annular carbon members and 1 annular nitrogen member. That is, the annular members are of from 5 to 6 carbon atoms and from 0 to 1 nitrogen atom. The benzene rings or pyridine rings—when one of the annular members is a nitrogen—are generally not fused, and there may be from 1 to 2 rings in the polyamino compound.

The total number of carbons in the arene polyamine will be from 5 to 16 carbons, more usually from 5 to 12 carbons.

When the rings are carbocyclic, the total number of carbons will most usually be in the range of from 6 to 12 carbons.

The preferred compounds of this invention are those where X is CH and the number of amino groups are of from 2 to 6, more preferably of from 2 to 4. As indicated, the preferred compounds are those in which the amino groups are primary.

The benzene polyamines which find use in this invention have the following formula

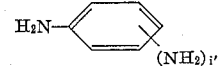

wherein $i'$ is of from 1 to 3, preferably of from 1 to 2. While the amino groups may be ortho to each other, it is preferred that they be at least meta, that is, separated from each other by at least 3 carbons. The benzene polyamines may also have lower alkyl substituents, such as methyl, ethyl, propyl, isobutyl, tert.-butyl, etc., and therefore will vary from 6 to 12 carbons, more usually from 6 to 10 carbons. Methyl will be the most usual alkyl substituent.

Illustrative of compounds which are included in the above formula are o-, m-, p-phenylenediamine, 1,2,4-benzenetriamine, 1,3,5-benzenetriamine, 1,2,4,5-benzenetetramine, 5-methyl-1,3-phenylenediamine, 4-tert.-butyl-1,3-phenylenediamine, etc.

The semidines used in this invention have the following formula

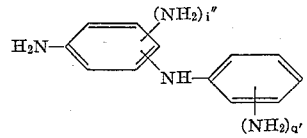

wherein $i''$ is a cardinal number of from 0 to 1, $q'$ is a cardinal number of from 0 to 1 and usually equal to $i''$. The semidines also may be substituted by lower alkyl groups, but will generally be unsubstituted, or at most, substituted by methyl groups. Usually, the semidines will be of from 12 to 16 carbons, more usually of from 12 to 14 carbons, and most usually of only 12 carbons.

Illustrative compounds which come within the above formula are o-, m-, and p-semidines, 3-amino-5-(3'-phenylamino)aniline, etc.

The benzidines which find use in this invention have the following formula

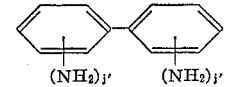

wherein $j'$ varies from 1 to 3, more usually from 1 to 2. The number of amino groups on each of the rings need not be the same. The benzidines may also be substituted by lower alkyl groups and therefore will vary from about 12 to 20 carbons, more usually from 12 to 16 carbons. While various lower alkyl groups may be present as substituents, such as methyl, ethyl, propyl, isobutyl, tert.-butyl, the preferred alkyl substituent is methyl. Therefore, most usually the benzidines will be of from 12 to 14 carbons.

Illustrative compounds which are within the above formula are 2,4,2′,4′-tetraamino biphenyl, 3,4,3′,4′-tetraamino biphenyl, 2,4,5,2′,4′,5′-hexaamino biphenyl, 2,4,2′,4′-tetraamino-6,6′-bitolyl, etc.

The pyridine polyamines have the following formula

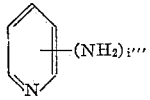

wherein $i'''$ varies from 2 to 3. As previously indicated, the pyridine ring may be substituted with lower alkyl groups and will therefore vary from 5 to 11 carbons, but usually will be substituted by methyl, if at all, therefore being of from 5 to 6 carbons.

Illustrative of compounds included in the above formula are 2,4-diaminopyridine, 2,6-diaminopyridine, 2,4,6-triaminopyridine, 2,6-diamino-4-picoline, 4,6-diamino-2-picoline, etc.

The amines used in this invention are reacted with dicarboxylic cyclic anhydrides, which have long hydrocarbon chains, under conditions which form imides with the primary amino group. (As previously indicated, amides may also be present.) The carboxylic acids of choice are those such as succinic anhydride, maleic anhydride, glutaric anhydride, phthalic anhydride, etc.

The preferred anhydride is the alkenyl succinic anhydride of the following formula

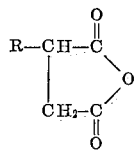

wherein R is an alkenyl group, most conveniently obtained by polymerizing an olefin containing from about 2 to 5 carbon atoms. The molecular weight of the resulting polymer will generally be in the range of about 400 to 3000, more usually in the range of about 700 to 1200. Useful olefins are illustrated by ethylene, propylene, 1-butene, 2-butene, isobutene, 1-pentene and mixtures thereof, preferably isobutene. The methods of polymerizing such olefins to the polymers of the designated molecular weight are well known in the art and do not require exemplification here. (See U.S. Patents Nos. 3,024,195 and 3,018,250.)

The succinic anhydride compound is reacted with the arene polyamines to form imide derivatives. At least 1 of the amino groups will form an imide derivative and generally not more than 3. That is, from 1 to 3 of the amino groups, preferably one, will react with the anhydride to form an imide. The resulting imides may be indicated by the following generic formula

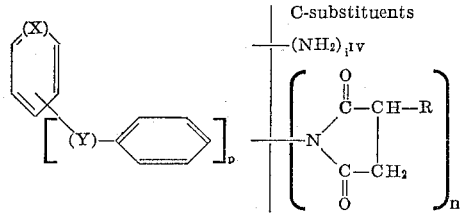

wherein X is CH or N (as defined previously), R is as defined previously, Y is a single valence bond (designated as — or NH), $p$ varies from 0 to 1, the amino and the succinimido radical are substituents on any annular carbon, $i^{IV}$ varies from 0 to 5, $n$ varies from 1 to 3, and $i^{IV}+n$ is equal to or less than 6. Preferred compounds have $n$ equal to from 1 to 2 and $i^{IV}$ from 1 to 4 and $i^{IV}+n$ equal to 2 to 5. When X is N, there is an amino or succinimido radical bonded to the pyridine ring.

The compounds of preferred subgenera are indicated by the following formulas:

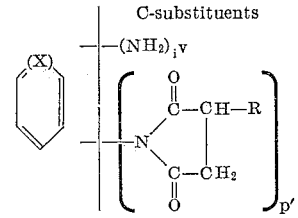

wherein X is CH or N (as defined previously), $i^V$ is a cardinal number of from 1 to 2 and $p'$ is a cardinal number of from 1 to 3, $i^V+p'$ being equal to or less than 4, preferably from 2 to 4, and

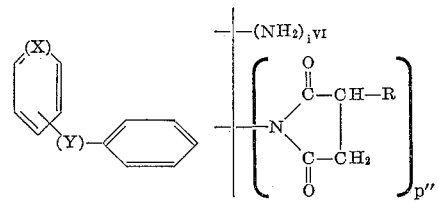

wherein X is N or CH, preferably CH, Y is an NH or a single valence bond (designated as —, i.e., biphenyl or phenyl pyridine, $i^{VI}$ is a cardinal number of from 0 to 4 and $p''$ is an integer of from 1 to 3, the sum of $i^{VI}$ and $p''$ being equal to or less than 6, preferably of from 2 to 5. R is as defined previously.

The succinimide derivatives are prepared by reacting the succinic anhydride compound with the desired arene amine at elevated temperatures, usually removing water. A solvent need not be used, although inert solvents may be used, such as polyethers, sulfoxides, pyridine, aromatic hydrocarbons aliphatic hydrocarbons, mixtures thereof, etc. Temperatures will usually be in the range of 250°–600° F., preferably 300°–400° F. Depending on the temperature and reactants, the time may vary from 0.1 to 24 hours. At the end of the reaction, the mixture is cooled and then extracted with $C_5$–$C_{10}$ hydrocarbons (aliphatic) and filtered. Occasionally, excess amine will be removed by washing with dilute mineral acid followed by washing with mild aqueous base. The mole ratio of material used will vary with the reactants as well as the desired product. Mole ratios of the amine derivative to the succinic anhydride will generally be in the range from 1 to 5.

The arene amines may be used as their mineral acid salts, e.g., hydrochlorides. Particularly when using the mineral acid salt, it is desirable to add an organic or inorganic base to aid the reaction. Illustrative of such bases are pyridine, triethyl amine, sodium carbonate, potassium hydroxide, etc.

The succinimide derivatives of the arene polyamines may be further modified with poly-C-carboxyl hydrocarbon compounds to form bis-derivatives. The compounds used to form the bis-derivatives will generally be of from 2 to 16 carbons, more usually of from 4 to 12 carbons. There can be from 2 to 4 carboxyl groups present, i.e., di-, tri- and tetracarboxyl compounds, also cyclic anhydrides. Of course, there must be present a free amino group on the succinimide derivative of the arene amine in order to obtain the bis-derivatives.

Illustrative of various polybasic acid compounds which may be used to prepare the bis-derivatives are isophthalic acid, terephthalic acid, pyromellitic acid, azelaic acid, oxalic acid, etc.

Occasionally, it may be preferable to form the bis-arene amine derivative first and then form the succinimide derivative. Formation of amides and imides is known in the art and does not require exemplification. The bis-arene amine derivative may then be reacted with the alkenyl succinic anhydride as described previously.

An example of the bis-derivatives is the product produced from pyromellitic acid and phenylene diamine and having the formula

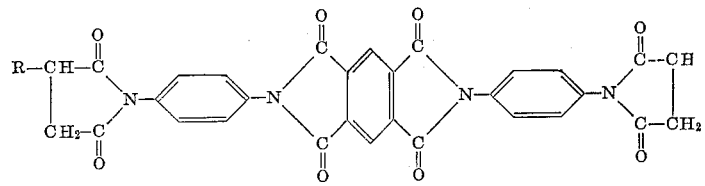

wherein R is as defined previously.

The compounds of this invention can be used with various base oils which find use as lubricating oils, such as naphthenic base, paraffin base and mixed base petroleum lubricating oils; other hydrocarbon lubricants, e.g., alkylene polymers (such as polymers of propylene, butylene, etc., and the mixtures thereof); alkylene oxide type polymers (e.g., propylene oxide polymers) and derivatives, including alkylene oxide polymers prepared by polymerizing the alkylene oxide in the presence of water or alcohols, e.g., ethyl alcohol; dicarboxylic acid esters (such as those which are prepared by esterifying such dicarboxylic acids as adipic acid, azelaic acid, suberic acid, sebacic acid, alkenyl succinic acid, fumaric acid, maleic acid, etc., with alcohols, such as butyl alcohol, hexyl alcohol, 2-ethylhexyl alcohol, dodecyl alcohol, etc.); liquid esters of acids of phosphorus; alkylbenzenes (e.g., monoalkylbenzene, such as dodecylbenzene, tetradecylbenzene, etc., and dialkylbenzenes, e.g., n-nonyl 2-ethylhexylbenzene); polyphenyls, e.g., biphenyls and terphenyls; alkylbiphenyl ethers; silicon compounds, e.g., tetraethyl silicate, tetraisopropyl silicate, tetra-(4-methyl-2-tetraethyl) silicate, hexyl-(4-methyl-2-pentoxy) disiloxane, poly(methyl)siloxane, poly(methylphenyl)siloxane, etc.

The above base oils may be used individually or in combination whenever miscible or made so by the use of mutual solvents. The above-described alkenyl succinimides of this invention can be used in oils of lubricating viscosity in amounts of from about 0.1% to 80% by weight. When the oil is to be used in an engine, usually the amount will be 0.1 to 10 weight percent, more usually 0.25 to 5 weight percent. However, the excellent solubility of the compounds of this invention in oil permits their formulation as concentrates, which may be diluted prior to use. As concentrates, the amount of the alkenyl succinimide may range from about 10 to 80%.

Preferably, a zinc dihydrocarbyl dithiophosphate is used in the engine oil with the detergents of this invention. (Hydrocarbyl is a monovalent organic radical containing only carbon and hydrogen and includes aliphatic, alicyclic and aromatic radicals.) The hydrocarbyl groups are of from 4 to 20 carbons, and about 6 to 50 mM./kg. of the dithiophosphate is used. Preferably, the hydrocarbyl groups are alkyl or alkaryl.

The following examples are offered by way of illustration and not by way of limitation.

Example 1

Into a 1000 liter reaction flask was introduced 500 g. of an oil solution containing about 42 weight percent PIBSA (polyisobutenyl succinic anhydride having an average molecular weight of 1030), 52.6 g. of 1,3,5-benzenetriamine trihydrochloride, and 50 ml. of diglyme (dimethyl ether of diethylene glycol). The mixture was stirred until it became homogeneous, and 136.5 g. of triethylamine was then added. After heating the mixture under a nitrogen atmosphere at 200° F. for 3 hours, the temperature was raised to 310° F. and held there for 2 hours. At the end of this time, the mixture was cooled, diluted with 1000 ml. of mixed hexanes and then filtered through Celite 545. 300 ml. of absolute ethanol was then added as well as 100 ml. of water, and the resulting layers separated. The hexane layer was dried, and the hexane stripped in vacuo. The resulting product weighed 499 g. Analysis showed 0.75, 0.72 weight percent nitrogen. Basic nitrogen determined by titration was 0.08, 0.08 weight percent.

Example 2

Into a 500 ml. reaction flask was dissolved 85.5 g. of p-phenylenediamine in dioxane. Over a period of 30 minutes, 200 g. of an oil solution containing about 42 weight percent PIBSA (average molecular weight ~1030) was added. When the addition was complete, dioxane was stripped off as rapidly as possible in vacuo, a mixture of aromatic hydrocarbons (B.P.=~360° F.) added and the mixture heated to 350° F. in a nitrogen atmosphere until water no longer evolved.

After the reaction mixture had cooled to room temperature, an equal volume of mixed hexanes was added, the mixture filtered and extracted twice with 250 ml. of 0.5 N HCl each time, then with 250 ml. of 5% aqueous sodium carbonate and finally with water. The hydrocarbon layer was stripped in vacuo at 320° F. The resulting residue was dissolved in 1500 ml. of mixed hexanes, filtered through Celite 512, and then the hexanes stripped at 320° F. in vacuo. Analysis of the product showed 1.11, 1.10 weight percent nitrogen and 0.47 weight percent basic nitrogen.

Example 3

Into a 500 ml. reaction flask was introduced 50 g. of an oil solution containing about 43 weight percent PIBSA (average molecular weight ~968) and 7.94 g. of 3,3'-diamino benzidine tetrahydrochloride. The mixture was heated at 300° F. for 2 hours. Pyridine was then added incrementally over a period of 16 hours for a total addition of pyridine of 10.8 ml., while maintaining the temperature at 300° F.

The reaction mixture was then dissolved in about 1000 ml. of mixed hexanes and filtered through Celite 545. The hexanes were stripped at elevated temperature and in vacuo, yielding 47 g. of a product. Analysis showed 1.00, 1.00 weight percent nitrogen and 0.03 weight percent basic nitrogen.

Example 4

Into a reaction flask was introduced 840 g. of p-phenylenediamine and 1 liter of mixed aromatic hydrocarbons (B.P.=~360° F.) and brought to refluxing. An oil solution containing about 42 weight per PIBSA (1875 g.) (average molecular weight ~1030) preheated to 200° F. was added slowly. The reaction mixture during the addition was maintained at reflux (350–360° F.), water being removed with a Dean-Stark trap. After 1 hour, the reaction mixture was cooled to room temperature and diluted with an equal volume of mixed hexanes. Insoluble solids were filtered off and extracted twice with 1 liter of 0.5 N HCl, once with 1 liter of a 5% aqueous solution of sodium carbonate and then finally with water. The hydrocarbon solvent was then stripped in vacuo at 320° F. and the residue dissolved in about 10 liters of mixed hexanes, filtered through Celite and the hexanes removed in vacuo at 320° F. Analysis showed 1.01, 1.02 weight percent nitrogen and 0.44 weight percent basic nitrogen.

Into a reaction flask was charged 479 g. of the above product and 20.6 g. of pyromellitic anhydride. The mixture was stirred for 5 minutes under nitrogen and then heated at 350° F. for 1 hour. The final product weighed 486 g. Analysis showed 1.12, 1.14 weight percent nitrogen, 0.05 weight percent basic nitrogen and 2.57 weight percent oxygen.

*Example 5*

Into a 1000 ml. reaction flask was introduced 48.9 g. of 2,4-diamino diphenylamine and 600 g. of an oil solution containing about 42 weight percent PIBSA (average molecular weight ~1030). The mixture was then heated for 2 hours at 320° F. under a nitrogen atmosphere.

The product was cooled and dissolved in 1200 ml. of mixed hexanes and filtered. To the filtrate was added 360 ml. of absolute ethanol and the mixture warmed slightly. Water (120 ml.) was then added slowly and the layers allowed to separate. The hexane layer was stripped of hexane under vacuum at 310° F., yielding 635 g. of product. Nitrogen analysis showed the product to be 1.43, 1.43 weight percent nitrogen and 0.48, 0.49 weight percent basic nitrogen.

*Example 6*

Into a 3-liter reaction flask was introduced 442 g. of p-phenylenediamine and 1 liter of a mixture of aromatic hydrocarbons (B.P.=~360° F.) to which was slowly added 1000 g. of an oil solution containing about 42 weight percent PIBSA (average molecular weight ~1030), while maintaining the reaction at reflux. The water which formed was removed by a Dean-Stark apparatus over a period of 1 hour while maintaining the mixture at reflux under nitrogen.

The reaction mixture was then cooled to room temperature, an equal volume of mixed hexanes added, the insoluble solids filtered away and the hexane solution extracted twice with 1 liter of 0.5 N hydrochloric acid, once with 1 liter of a 5% aqueous sodium carbonate solution and once with 1 liter of water. The hydrocarbon solvents were stripped at 320° F. in vacuo, and the resulting residue was dissolved in about 4 liters of mixed hexanes and filtered through Celite 512. The hexanes were then stripped in vacuo at 320° F. leaving 897 g. Analysis of the product showed 1.48, 1.47 weight percent nitrogen and 0.52, 0.50 weight percent basic nitrogen.

*Example 7*

Into a solution of 324 g. of p-phenylenediamine in diglyme was slowly added a solution of 66 g. of pyromellitic anhydride in diglyme. When the addition was completed, the reaction mixture was heated to 320° F. for 3 hours under a nitrogen atmosphere. The mixture was then cooled to room temperature and filtered.

The solid was washed with 2000 ml. of hot diglyme and the mixture filtered. The solid was then washed once with benzene, once with hot dimethyl formamide, once with absolute ethanol and once with ether. The product was then dried for 3 hours on a steam plate under nitrogen, yielding 120 g. Analysis showed the product to have 13.60, 13.66% by weight nitrogen.

Into a 2-liter reaction flask was charged 50 g. of the above product and 100 ml. of dimethyl sulfoxide. To this mixture was slowly added 556 g. of an oil solution containing about 42 weight percent PIBSA (average molecular weight ~1030). The reaction mixture was then heated in vacuo at 320° F. for 3 hours. At the end of this time, the mixture was allowed to cool and then dissolved in 4 liters of mixed hexanes, centrifuged and filtered through Celite 541. The filtrate was washed three times each with 1 liter of 50/50 methanol water solution and then once with 1 liter of water.

The hexanes were stripped in vacuo at elevated temperatures, yielding 568 g. of product. Analysis showed 0.95, 0.91 weight percent nitrogen.

*Example 8*

Into a flask was introduced 710 g. of an oil solution containing about 48 weight percent PIBSA (average molecular weight ~1030) and 105 g. 2,6-diaminopyridine and heated with stirring at 150° C. for about 1 hour. After cooling the reaction mixture and dissolving it in mixed hexanes, the hexane solution was extracted with aqueous ethanol. The hexanes were removed in vacuo. Analysis showed 0.60, 0.61 weight percent basic nitrogen.

In order to test the compounds of this invention, the compounds were tested under L-1 Supplement 1 conditions (MIL-L-2-1048, Supp. 1) as described in Coordinating Research Council Handbook, January 1946.

Using a Mid-Continent base oil SAE 30 containing .75 weight percent of the candidate detergent and 8 mM./kg. of zinc O,O-di(alkyl) phosphorodithioate (alkyl is of from 4-6 carbons), the following results were obtained:

TABLE I

| Compound | Hrs. | Rating | |
|---|---|---|---|
| | | Grooves | Lands |
| Ex. 1 | 120 | 20-, 3-, 3-0 | 120-40-1 |
| | 160 | 8-4-1-, 1 | 465-230-25 |
| Ex. 8 | 60 | 1-, 2-0-0 | 2-0-0 |
| | 120 | 6-2-, 2-, 1 | 225-5-0 |
| Base oil | 60 | [1] 38-10-10-10 | [1] 800-800-800 |

[1] Measured under the less severe L-1 conditions (MIL-L-2104A).

The grooves numbers refer to percentage deposits in the piston ring grooves; a zero evaluation being a clean groove; a number of 100 being a groove full of deposits. The lands numbers refer to the piston lands which are examined visually. To a piston skirt which is completely black is assigned a number of 800; to one which is completely clean is assigned a number of 0; to those intermediate between completely black and completely clean are assigned numbers intermediate in proportion to the extent and degree of darkening.

The following results were obtained using the Caterpillar 1-G test under MIL-L-45199 conditions. About 1.6 weight percent of the candidate detergent was used in a Mid-Continent SAE 30 base oil, to which was added 12 mM./kg. of Zn O,O-di(alkylphenyl) phosphorodithioates (alkyl is polypropylene of 12-15 carbons).

TABLE II

| Compound | Time (hrs.) | Rating | |
|---|---|---|---|
| | | Grooves | Lands |
| Ex. 5 | 60 | 71-10-2-7 | 565-260-800 |
| 4 | 60 | 75-10-3-2 | 800-300-205 |
| 6 | 60 | 28-8-2-2 | 325-200-185 |
| | 120 | 84-10-3-2 | 415-200-185 |
| Base oil [1] | 60 | 89-20-10-10 | 800-800-800 |
| Base oil | 60 | 95-15-5-3 | 500-800-320 |

[1] No phosphorodithioate.

It is evident from the above tables that the ashless detergents of this invention significantly enhance the operation of an engine by reducing deposits on the pistons, even under the severe conditions of the above tests.

As will be evident to those skilled in the art, various modifications on this process can be made or followed, in the light of the foregoing disclosure and discussion, without departing from the spirit or scope of the disclosure or from the scope of the following claims.

I claim:
1. The bis-derivative of a compound of the formula

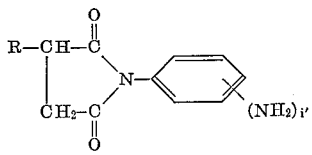

wherein R is an alkenyl group of from 400 to 3000 molecular weight, and $i'$ is an integer of from 1 to 3, formed by reacting said compound with a hydrocarbon polycarboxylic compound of from 2 to 4 carboxyl groups and from 2 to 16 carbon atoms thereby forming amide or imide linkages.

2. A bis-derivative according to claim 1 wherein the polycarboxylic compound is pyromellitic acid.

3. A lubricating oil composition comprising an oil of lubricating viscosity and from 0.1 to 80 weight percent of a compound according to claim 1.

4. A lubricating oil composition comprising an oil of lubricating viscosity, from 0.1 to 80 weight percent of a compound as described in claim 1 and from about 6 to 50 mM./kg. of zinc O,O-dihydrocarbyl dithiophosphoroate, wherein said hydrocarbyl groups are from 4 to 20 carbon atoms.

5. A compound of the formula

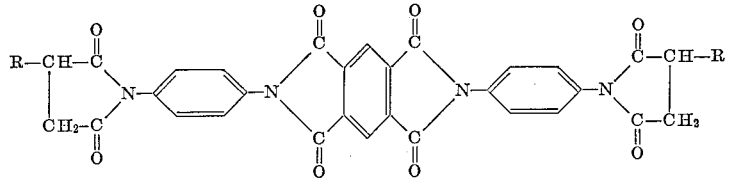

wherein R is an alkenyl group of from 400 to 3000 molecular weight.

References Cited by the Examiner

UNITED STATES PATENTS 3,194,812  7/1965  Norman et al. ---- 252—51.5 X
3,219,666  11/1965  Norman et al. ---- 252—51.5 X DANIEL E. WYMAN, *Primary Examiner.*

P. P. GARVIN, *Assistant Examiner.*